United States Patent [19]
Mohr

[11] Patent Number: 4,699,451
[45] Date of Patent: Oct. 13, 1987

[54] OPTICAL FIBER COIL HAVING JUXTAPOSED ENDS IN SAME OR ADJACENT LAYERS FOR ROTATION RATE MEASURING INSTRUMENT

[75] Inventor: Friedemann Mohr, Renningen, Fed. Rep. of Germany

[73] Assignee: International Standard Electric Corp., New York, N.Y.

[21] Appl. No.: 645,987

[22] Filed: Aug. 31, 1984

[30] Foreign Application Priority Data

Sep. 10, 1983 [DE] Fed. Rep. of Germany ....... 3332718

[51] Int. Cl.⁴ .................................................. G02B 6/26
[52] U.S. Cl. ............................... 350/96.15; 350/96.29; 350/320; 356/350
[58] Field of Search .................. 350/96.15, 96.29, 320; 356/350

[56] References Cited

U.S. PATENT DOCUMENTS

| | | | |
|---|---|---|---|
| 4,120,587 | 10/1978 | Vali et al. | 356/350 |
| 4,280,766 | 7/1981 | Goss et al. | 356/350 |
| 4,299,490 | 11/1981 | Cahill et al. | 356/350 |
| 4,432,647 | 2/1984 | Leitl | 356/350 |
| 4,573,795 | 3/1986 | Auch et al. | 356/350 |
| 4,588,296 | 5/1986 | Cahill et al. | 356/350 |

FOREIGN PATENT DOCUMENTS

| | | |
|---|---|---|
| 1298335 | 6/1969 | Fed. Rep. of Germany ...... 356/350 |
| 3136688A1 | 3/1983 | Fed. Rep. of Germany . |
| 3152704A1 | 4/1983 | Fed. Rep. of Germany . |
| 214701 | 8/1941 | Switzerland . |
| 2009396A | 6/1979 | United Kingdom . |
| 2121532A | 12/1983 | United Kingdom . |
| 2121954A | 1/1984 | United Kingdom . |

*Primary Examiner*—John Lee
*Attorney, Agent, or Firm*—Christie, Parker & Hale

[57] ABSTRACT

An optical fiber is coiled in an instrument in such a way that its beginning and its end belong to the same layer or to adjacent layers and are close together.

3 Claims, 4 Drawing Figures

OPTICAL FIBER COIL HAVING JUXTAPOSED ENDS IN SAME OR ADJACENT LAYERS FOR ROTATION RATE MEASURING INSTRUMENT

BACKGROUND OF THE INVENTION

The present invention relates to a rotation rate measuring instrument.

PRIOR ART STATEMENT

A rotation rate measuring instrument is disclosed in DE-OS No. 31 36 688 (copending application Ser. No. 417,510 filed Sept. 13, 1982 (now U.S. Pat. No. 4,573,795) by W. Auch et al. for ROTATION RATE MEASURING INSTRUMENT).

Such instruments are highly sensitive to external influences (e.g., sound waves, pressure, temperature, magnetic fields). To reduce such influences, the optical fiber in the prior art instrument is embedded in a compound.

It was found that the more such interference acts on the optical fiber asymmetrically with respect to the center of the optical fiber, the greater the effects of such interference will be.

SUMMARY OF THE INVENTION

In accordance with the present invention, the above-described and other disadvantages of the prior art are overcome by providing an optical fiber coil wherein two ends are located in the same winding layer or in juxtaposed layers. Thus, if a type of interference acts on the optical fiber in the region of the ends of the fiber, where their effects are the greatest, the interference will be symmetrical with respect to the paths of two light beams traversing the coil, and its effect on the rotation-rate measurement will be relatively small.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
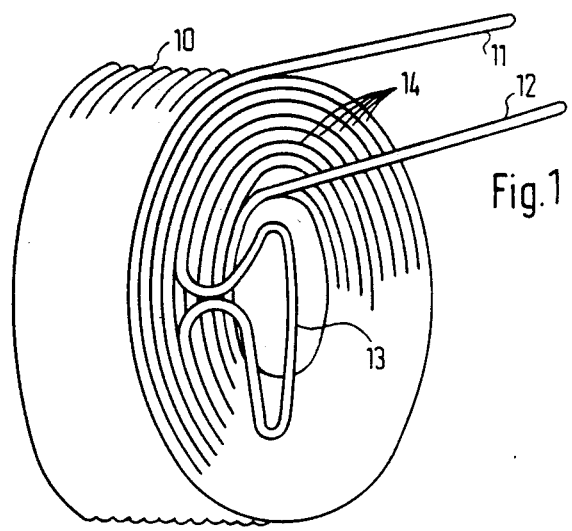
FIG. 1 is a perspective view of a partially constructed coil of the present invention.
Figure 2:
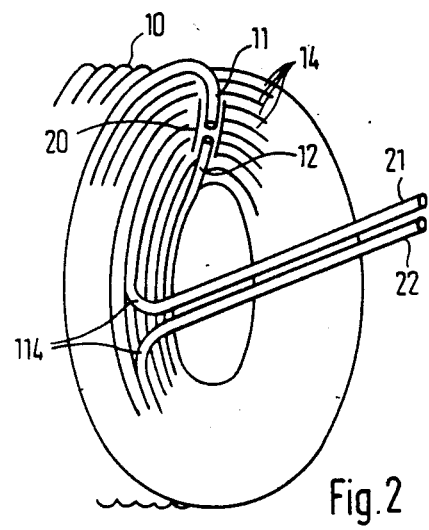
FIG. 2 is a perspective view of the coil of FIG. 1 in a finished condition.

A first method of manufacturing the optical-fiber coil of the novel rotation rate measuring instrument will be described with the aid of FIGS. 1 and 2. Several layers of optical fibers are wound on a mandrel (not shown in FIG. 1). One end of the optical fiber is designated by the ference numeral 12, and the individual layers by the reference numerals 14. After a few layers 14, one winding is placed so as to form a loop 13 which protrudes from the other windings. Then, normal turns are wound again. The fiber end which remains when the winding is complete is designated 11, and the complete coil is designated 10. Advantageously, the numbers of turns before and after the formation of the loop 13 are approximately equal.

To obtain an optical-fiber coil in which the beginning and the end of the optical fiber are close together, the ends 11 and 12 are connected by a splice 20 (FIG. 2), and the loop 13 is cut open to obtain two new fiber ends 21 and 22. These ends are juxtaposed and belong to the same layer 114.

Coil 10 is then connected to the other parts of a rotation rate measuring instrument. It is advantageous to embed the optical fiber in a compound, because this reduces external influences such as sound waves, temperature variations, etc. After such embedment, the mandrel can be removed from the windings, i.e., a self-supporting coil is obtained.

A suitable embedment compound is the type 6154 UV-curing adhesive of Panacol. The compound is chosen to have a low thermal conductivity, a high sound absorption coefficient, and a high vibration damping capacity.

The two methods described in the following are especially suited for the embedment:

(a) The optical fiber is drawn through the liquid compound, part of which adheres to the fiber. The fiber with the compound adhering to it is wound into a coil, and when the winding is complete, the compound is cured by means of ultraviolet light.

(b) A liquid compound is poured over the coil and fills the spaces between the windings. The compound is then cured. It is possible to pour the compound over a coil "cemented" according to (a) above or over an "uncemented" coil. A particularly suitable compound is a silicone rubber of low final hardness, with which heat and sound waves are effectively attenuated.

To reduce environmental influences, the entire coil 10 is advantageously enclosed with a heat-insulating jacket. It is also advantageous to shield the optical-fiber coil from magnetic fields, which, may also interfere with the propagation of light in the optical fiber. A further reduction in heat sensitivity is achieved if a heat-insulating material is used to fill in that portion of the coil where the mandrel was located during the winding process.

If the optical fiber has only a primary coating, it is advantageous to pigment this coating black. The pigmenting serves to couple out unwanted cladding modes, which would disturb the interference signal. If an uncoated optical fiber is used, i.e., if the fiber consists only of a core and a cladding, it is advantageous to pigment the embedment compound black.

If the mandrel used during the winding process is not removed after the winding, quartz glass will preferably be used for the mandrel.

Figure 3:
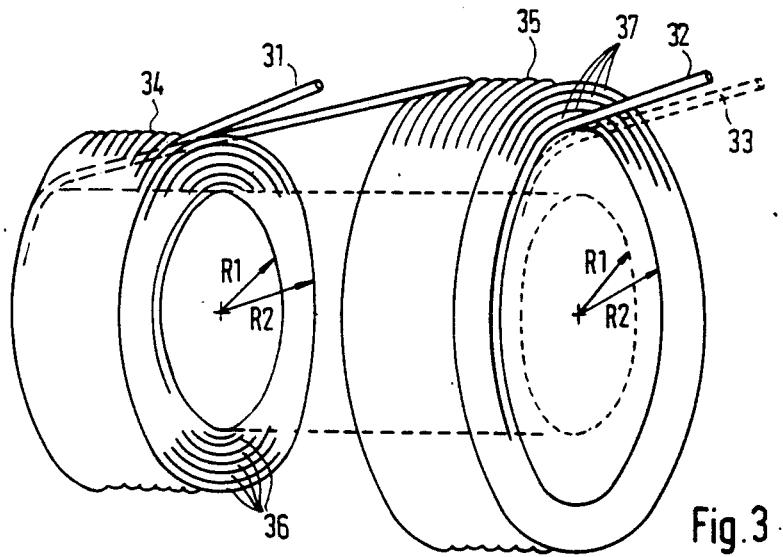
FIG. 3 is a perspective view of another embodiment of the coil of the present invention.

Another method of manufacturing the optical-fiber coil will now be described with the aid of FIG. 3. Two self-supporting coils are wound in succession. The outside diameter of one of the coils 34 is equal to the inside diameter of the other coil 35. First, the coil 35 is wound by forming several layers 37. The inside radius of this coil is R2. After the outermost layer has been wound, the optical fiber is wound, without interruption, into the second coil 34, which has an inside radius R1. The layers of the second coil are designated 36. The optical fiber now has two ends 32 and 31, one of which, the end of the first coil 35, protrudes from the innermost layer of the coil 35, while the other end projects from the outermost layer of the second, smaller coil 34. The outside radius of the smaller coil 34 is R2, so that this coil fits the other coil 35, perhaps exactly. After the mandrels (not shown in FIG. 3) necessary to wind the two coils have been removed, the smaller coil 34 is inserted into the larger coil 35. The two ends 32 and 33 of the optical fiber are now immediately adjacent to each other juxtaposed and belong to adjacent layers. The very small space between the innermost layer of the coil 35 and the outermost coil of the coil 34 is filled with an adhesive of high thermal conductivity. This insures that temperature changes will act on the two coils 34, 35 simultaneously and, hence, are not disturbing.

As regards the embedment in a compound and optimum shielding from external influences, the statements made in connection with the other embodiment apply equally as well to this embodiment.

With the novel coil arrangement, the effects of interference are minimized. It is particularly advantageous, of course, if interferences as such are kept small. This is achieved, for example, by embedding the optical fiber in a compound.

To reduce interference caused by the action of heat, the optical-fiber coil of the invention is surrounded with a thermally highly conductive metal jacket which can also perform the above-mentioned magnetic shielding function. The metal jacket is designed to not only surround the coil but also fill the interior of the self-supporting coil. This causes a "thermal short circuit," which results in a highly uniform temperature distribution over the entire surface of the coil.

Figure 4:
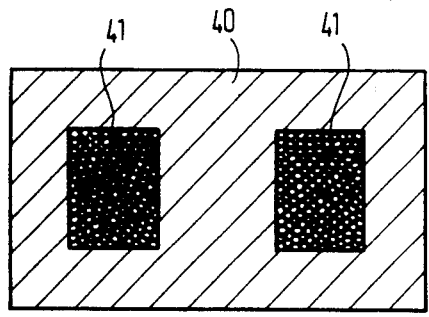
FIG. 4 is a cross-sectional view of a coil of the invention with a metal jacket.

FIG. 4 is a cross-sectional view of a coil in such a jacket. The jacket is designated 40, and the individual windings 41.

What is claimed is:

1. In a rotation rate measuring instrument, the combination comprising: an optical fiber coil approximately in the form of inner, outer and intermediate helical layers, said coil having juxtaposed ends emanating from the same intermediate layer or adjacent intermediate layers, and a loop of said optical fiber connecting said inner layer to said outer layer.

2. The method of fabricating an optical coil for a rotation rate measuring instrument, said method comprising the steps of: winding a few layers of an optical fiber into a coil, said layers being wound so that a loop of said fiber protrudes from said coil, and that, when the winding of the coil is complete, the two ends of the coiled optical fiber are joined, while the loop is cut to provide two juxtaposed ends.

3. The method of fabricating an optical coil for a rotation rate measuring instrument wherein at least a first coil is wound and then a second coil is wound, with an optical fiber having two ends being continuous between said first and second coils, said second coil being wound with an outer diameter less than the inner diameter of said first coil, and wherein said second coil, after it has been wound, is inserted into the first coil with the two ends of said optical fiber juxtaposed in adjacent winding layers.

* * * * *

UNITED STATES PATENT AND TRADEMARK OFFICE
CERTIFICATE OF CORRECTION

PATENT NO. : 4,699,451

DATED : October 13, 1987

INVENTOR(S) : Mohr

It is certified that error appears in the above-identified patent and that said Letters Patent is hereby corrected as shown below:

On the Front Page
[73] Assignee:   Change "International Standard Electric Corp." to -- Alcatel NV,-- Amsterdam, The Netherlands --.

Signed and Sealed this

Twenty-third Day of August, 1988

Attest:

DONALD J. QUIGG

*Attesting Officer*   *Commissioner of Patents and Trademarks*